(12) United States Patent
Zhong et al.

(10) Patent No.: US 10,808,814 B2
(45) Date of Patent: Oct. 20, 2020

(54) TRANSAXLE AND TWO-SPEED DRIVE MODULE THEREOF

(71) Applicant: Schaeffler Technologies AG & Co. KG, Herzogenaurach (DE)

(72) Inventors: Hu Zhong, Shanghai (CN); Peng Chen, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 78 days.

(21) Appl. No.: 16/094,538

(22) PCT Filed: Mar. 16, 2017

(86) PCT No.: PCT/CN2017/076938
§ 371 (c)(1),
(2) Date: Oct. 18, 2018

(87) PCT Pub. No.: WO2017/185901
PCT Pub. Date: Nov. 2, 2017

(65) Prior Publication Data
US 2019/0120350 A1    Apr. 25, 2019

(30) Foreign Application Priority Data

Apr. 28, 2016 (CN) .......................... 2016 1 0278591

(51) Int. Cl.
*F16H 37/04* (2006.01)
*B60K 17/08* (2006.01)
(Continued)

(52) U.S. Cl.
CPC ........... *F16H 37/041* (2013.01); *B60K 17/08* (2013.01); *F16H 37/02* (2013.01);
(Continued)

(58) Field of Classification Search
CPC .. F16H 37/041; F16H 37/0813; F16H 37/042; F16H 2037/028; F16H 2200/0034
See application file for complete search history.

(56) References Cited

U.S. PATENT DOCUMENTS

| 4,909,776 A | * | 3/1990 | Sakakibara | ........... F16H 37/022 |
| | | | | 474/11 |
| 9,534,665 B1 | * | 1/2017 | Pritchard | ................. B60K 1/00 |

(Continued)

FOREIGN PATENT DOCUMENTS

| CN | 101446337 | 6/2009 |
| CN | 101684857 | 3/2010 |

(Continued)

*Primary Examiner* — Stacey A Fluhart
(74) *Attorney, Agent, or Firm* — Volpe Koenig

(57) ABSTRACT

A transaxle and a two-speed drive module thereof. The two-speed drive module comprises an input shaft, an output shaft, and gear sets used for transmitting power between the input shaft and the output shaft. The gear sets comprise: a two-speed gear set having two groups of shift gear pairs that have different speed ratios, the shift gear pairs being capable of transmittingly connecting to or disconnecting from the input shaft so as to output the rotational speed of the input shaft at different speed ratios; a planetary gear set having an output end thereof being transmittingly connected to the output shaft; and a connecting gear set by which the two-speed gear set is transmittingly connected to the planetary gear set. The two-speed drive module can implement a reduction in the radial dimension, and can reduce the ground clearance of a transaxle.

13 Claims, 6 Drawing Sheets

(51) Int. Cl.
*F16H 37/02* (2006.01)
*F16H 37/08* (2006.01)

(52) U.S. Cl.
CPC .... *F16H 37/0813* (2013.01); *F16H 2037/028* (2013.01); *F16H 2200/0008* (2013.01); *F16H 2200/0034* (2013.01); *F16H 2200/2005* (2013.01)

(56) References Cited

U.S. PATENT DOCUMENTS

| | | | |
|---|---|---|---|
| 2010/0075800 A1 | 3/2010 | Suzuki et al. | |
| 2010/0248885 A1* | 9/2010 | Phillips | B60K 17/04 475/205 |
| 2016/0017968 A1* | 1/2016 | Kaltenbach | B60K 1/00 475/198 |
| 2016/0312869 A1 | 10/2016 | Walter | |
| 2019/0376587 A1* | 12/2019 | Dahlback | F16H 3/44 |

FOREIGN PATENT DOCUMENTS

| | | |
|---|---|---|
| CN | 101852276 | 10/2010 |
| CN | 102371893 | 3/2012 |
| JP | 2009036231 | 2/2009 |
| WO | 2014126282 | 8/2014 |
| WO | 2015086016 | 6/2015 |

\* cited by examiner

TRANSAXLE AND TWO-SPEED DRIVE MODULE THEREOF

This application claims priority to a Chinese patent application filed on Apr. 28, 2016 with the Chinese Patent Office under application number 201610278591.8 with the title "Transaxle and its Two-speed Drive Module", the entire contents of which are incorporated herein by reference.

TECHNICAL FIELD

This invention relates to the field of vehicle, in particular, to a kind transaxle and its two-speed drive module.

BACKGROUND

In traditional vehicles, the transaxle is a mechanism located at the end of the transmission system and is used to change the speed and torque from the transmission then transmitting them to the mechanism of the driving wheels. The transaxle generally includes a transaxle case, a main decelerator, a differential and so on. However, for the vehicles using the front-engine and front-axle drive, the two powertrains—the transmission and the transaxle, are integrated into a single unit, which is located inside the drive axle housing. This type of drive axle is called a transaxle.

When a transaxle is used in hybrid vehicles or pure electric vehicles, the motor will be used as the power source of the transaxle. In order to increase the driving torque without increasing the size and cost of the motor, GKN introduced a transaxle with a two-speed drive module in 2014. It has two sets of shift gear pairs at the output of the motor that can be switched. The power output from the motor is transmitted to the differential via a spur gear sets through the shift gear pairs. The drive module adjusts the output gear ratio of the motor by switching shift gear pairs of different gears, to increase the driving torque and optimize the driving dynamics performance. In this drive module, each gear pair is arranged in the radial direction, and the output gear of the spur gear sets serves as the final gear of the entire drive module.

The size of the final gear affects the maximum output torque of the entire transaxle. In order to increase the maximum output torque, the diameter of the final gear is usually quite large, which in turn results in a larger diameter of the drive axle case at the final gear position, which in turn results in the distance between the transmission and the ground not being high enough, and thus cannot be used in a SUV. Correspondingly, due to the distance from the ground, the range of the diameter of the final gear is also limited, which in turn limits the output torque of the entire transaxle.

SUMMARY

The objective to be achieved by this invention is that in the existing two-speed drive module, the radial dimension of the drive module at the final gear position is quite large, and the output torque of the entire transaxle is limited.

To meet these objectives, this invention provides a transaxle two-speed drive module for the transaxle, including an input shaft, an output shaft, and a gear assembly for transmitting power between the input shaft and the output shaft; the gear assembly includes: a two-speed gear set having two sets of shift gear pairs with different speed ratio, the shift gear pairs is capable of being connected or disconnected from the input shaft drive, to output the rotational speed of the input shaft at different ratios to the planetary gear set, the output end of the planetary gear set is connected to the output shaft drive. The connecting gear set, the two-speed gear set and the planetary gear set are connected via a connecting gear set drive connection.

Optionally, the two-speed gear set also includes an intermediate shaft; the shift gear pairs include mutually compatible idler gears and solid idler gears, and the idler gears are idled on either the input shaft or the intermediate shafts; the solid idler gears are fixed on the other; the synchronizer is fixed on the same one of either the input shaft or the intermediate shaft that the idler gear is fixed on, to engage or disengage with the idler gear of the shift gear pairs.

Optionally, the idler gear and the synchronizer are both on the input shaft; the solid idler gear is on the intermediate shaft; and the connecting gear set is along the axial direction of the intermediate shaft and is between the two sets of shift gear pairs.

Optionally, the connecting gear set includes a first gear fixed on the intermediate shaft, and a second gear connected to the input end of the planetary gear set; between the first gear and the second gear, the transmission is connected via a transmission part.

Optionally, the transmission part is a gear, a belt or a chain.

Optionally, the idler gear and the synchronizer are all on the intermediate shaft, the solid idler gear is on the input shaft; and the connecting gear set is on one side of the two shift gear pairs, along the axial direction of the intermediate shaft.

Optionally, the connecting gear set includes a first gear fixed on the intermediate shaft, and a second gear connected to the input end of the planetary gear set; the first gear and the second gear mesh with each other.

Optionally, the planetary gear set uses a sun gear as the input end, and a planet carrier as an output end, to connect to the output shaft.

This invention also provides a transaxle comprising any of the above-mentioned two-speed driving modules, and a motor as well as a differential. The output end of the motor is connected to the input shaft of the two-speed drive module. The input end of the differential is connected to the output shaft of the two-speed drive module.

Compared with the existing technology, the technical solution of this invention has the following advantages:

In this invention, a planetary gear set is added in the two-speed drive module, and the planetary gear set is used as the final gear. Compared with the existing spur gear set, the two-speed drive module, on one hand, can increase the input torque amplification function, on the one hand, the can reduce the radial dimension of the two-speed drive module, so that to reduce the diameter of the drive axle case on the final gear, thus to reduce the ground clearance of the transaxle.

DETAILED DESCRIPTION

In order to make the above objects, features, and advantages of this invention easier to be understood, the specific embodiments of this invention will be described in detail below with reference to the accompanying drawings.

The First Embodiment

Figure 1:
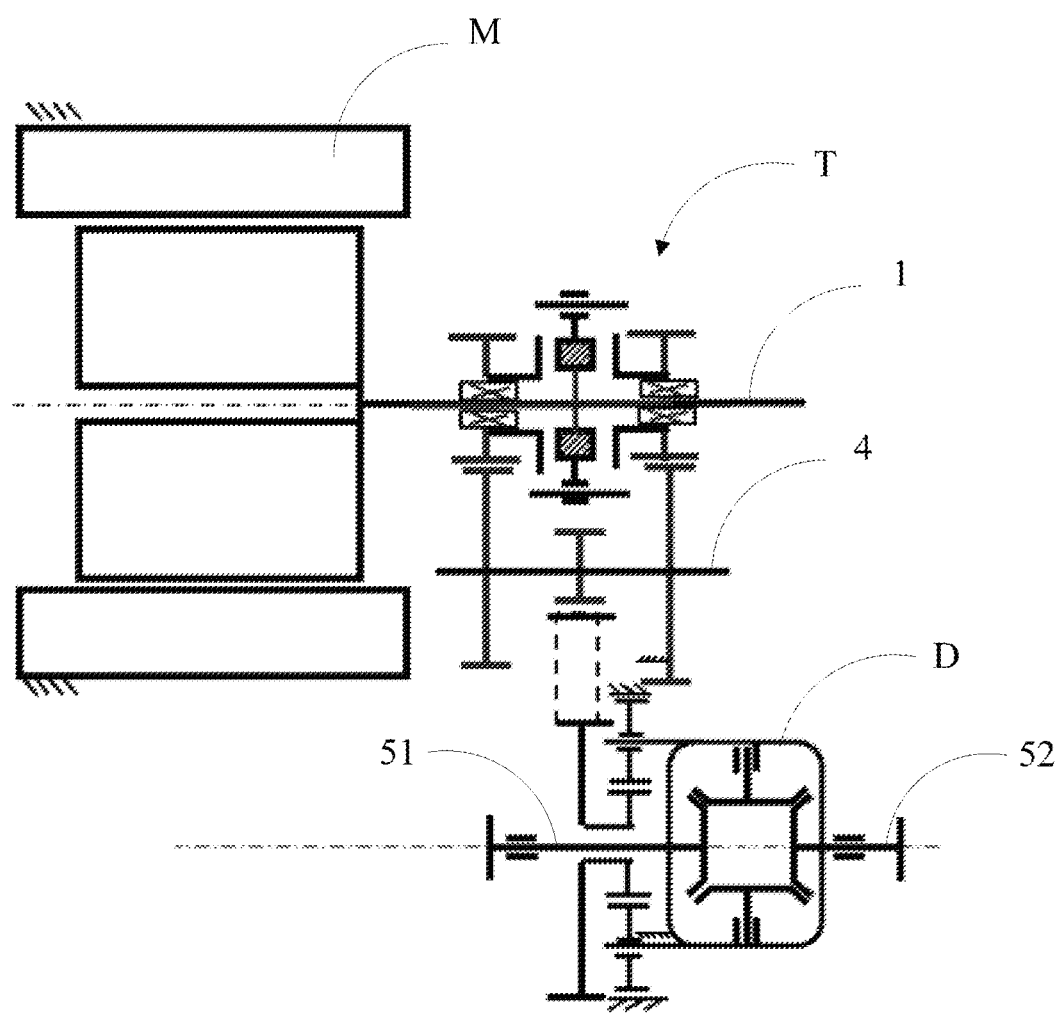
FIG. 1 is a structural schematic diagram of a transmission axle of the first embodiment of this invention.
Figure 2:
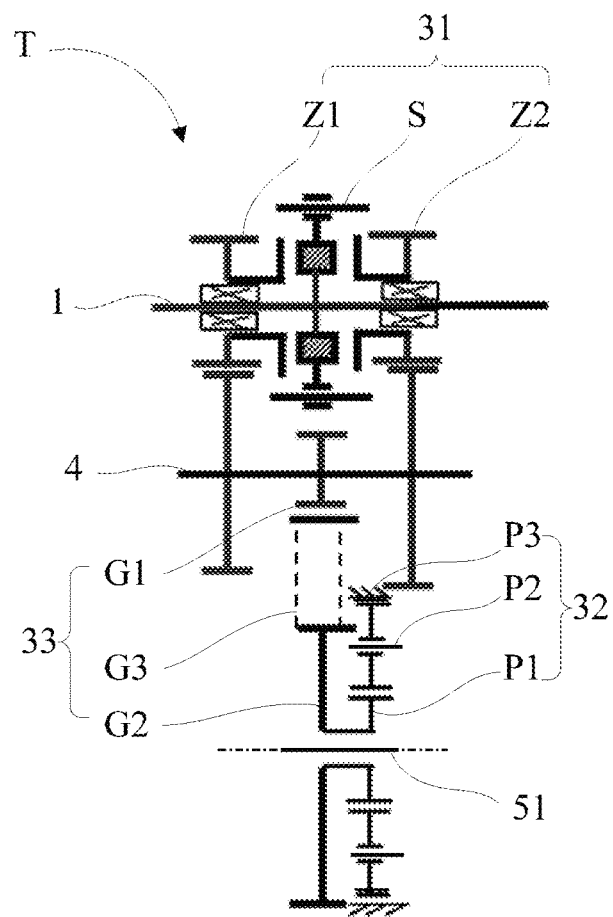
FIG. 2 is a schematic structural diagram of the two-speed drive module of the first embodiment of this invention.

An embodiment of this invention provides a transaxle two-speed drive module T. Referring to FIGS. 1 and 2, the two-speed drive module T includes an input shaft 1 and an output shaft (not shown in the drawing) and a gear set for transmitting power between the input shaft 1 and the output shaft. The input torque from the power source is input from the input shaft 1, the gear set will amplify the torque and then output shaft will output it as the output torque.

As shown in FIG. 2, the gear set includes three major components: a two-speed gear set 31, a planetary gear set 32, and a connecting gear set 33. In which, the two-speed gear set 31 has two sets of shift gear pairs Z1, Z2 with different speed ratios, they can be respectively connected or disconnected from the input shaft 1 to output the rotational speed of the input shaft 1 at different speed ratios.

The planetary gear set 32 is the final gear of a gear set, its output is drive-connected to the output shaft. The two-speed gear set 31 and the planetary gear set 32 are connected via a connecting gear set 33: in the torque transmission direction, the connecting gear set 33 is between the two-speed gear set 31 and the planetary gear set 32, also, at its input end, it is drive-connected with the output end of the two-speed gear set 31 and at its output end, drive-connected with the input end of the planetary gear set 32.

After the input torque is input from the input shaft 1, it is transmitted to the two-speed gear set 31 for a torque amplification, and then transmitted by the two-speed gear set 31 to the connecting gear set 33 for a secondary torque amplification. Finally, the third torque amplification is conducted by the connecting gear set (33) to the planetary gear set 32, and the amplified final torque is output to the output shaft by the planetary gear set 32 as the output torque.

In this solution, a planetary gear set 32 is added to the two-speed drive module T, and a planetary gear set 32 is placed at the end of the drive module T as the final gear. Based on the small size, large speed ratio of the planetary gear set 32, it is possible not only to increase the input torque amplification of the two-speed drive module T, but also to reduce the radial dimension of the two-speed drive module T. Therefore, when the two-speed drive module T is installed on a transaxle of a vehicle, the diameter of the drive axle case that houses the two-speed drive module T can be reduced on the final gear, thus reduce the ground clearance of the transaxle.

The planetary gear set 32 takes the sun gear P1 as the input end and the planet carrier P2 as the output shaft of the two-speed drive module T. It should be noted that because the planetary gear set 32 has a good torque amplification function, the speed ratio of the connecting gear set 33 may not need to be set very high, so the diameter of the output gear of the connecting gear set 33 can also be designed relatively small, thus to ensure the ground clearance of the transaxle.

With continued reference to FIGS. 1 and 2, the two-speed gear set 31 further includes an intermediate shaft 4 and a synchronizer S. The shift gear pairs Z1, Z2 are supported by the input shaft 1 and the intermediate shaft 4. In particular, the two sets of shift gear pairs Z1, Z2 respectively have an idler gear and a solid idler gear (not shown in the drawing). Each shift gear pairs is on either the input shaft 1 or the intermediate shaft 4 via an idler gear, and is fixed on the other of the input shaft 1 and the intermediate shafts 4 via a solid idler gear. The synchronizer S is fixed to the idler gear on the same of input shaft 1 and the intermediate shaft 4, and is used to engage or disengage the idler gear of the shift gear pairs Z1, Z2. In order to save axial space, the idler gears of the two shift gear pairs Z1, Z2 can share one synchronizer S, and the synchronizer S is axially located between the two idler gears.

In this embodiment, the idler gears of the two sets of shift gear pairs Z1, Z2 are all located on the input shaft 1 as the driving gears of the shift gear pairs, and the solid idler gear is located on the intermediate shaft 4 as the driven gear of shift gear pairs. Synchronizer S is sleeved on the input shaft 1 and is located between the two idler gears.

The connecting gear set 33 is located along the axial direction of the intermediate shaft 4 between the two sets of shift gear pairs Z1, Z2. As can be seen from FIGS. 1 and 2, the position of the connecting gear set 33 is between the two solid idler gears in the axial direction, which can effectively reduce the axial dimension of the drive module T.

In particular, the connecting gear set 33 includes a first gear G1 fixed to the intermediate shaft 4, and a second gear G2 connected to the input end of the planetary gear set 32. The first gear G1 and the second gear G2 are connected via a transmission part G3. The transmission part G3 can be a gear, a belt, a chain, or other conveyor. In this embodiment, the transmission part G3 is chosen to be a gear with odd numbered gears, such as one or three mutually meshed gears. In other embodiments, the first gear G1 and the second gear G2 may also be directly meshed.

In summary, compared with the existing technology, the two-speed drive module T of the embodiment of this invention can achieve a larger torque amplification function, and has a smaller radial size, which is helpful to increase the ground clearance of the transaxle, meanwhile, having compact axial size to allow more space for the exhaust pipe arrangement.

The embodiment of this invention further provides a transaxle, as shown in FIG. 1, which includes the aforementioned two-speed drive module T, and a motor M, a differential D, and two half shafts 51 and 52 which are connected to the output end of the differential D. In which, the motor M, as the power supply, its output end is connected with the input shaft 1 of the two-speed drive module T. The input end of the differential D is connected with the output shaft of the two-speed drive module T. The second gear G2 of the connecting gear set is idled on the half shaft 51 of the differential D. The sun gear P1 of the planetary gear set 32 is also idled on the half shaft 51 and is fixed on the drive axle case (not shown) via the ring gear P3. The output torque output from the motor M is amplified by the two-speed drive module T. and is distributed through the differential D to the two half shafts 51, 52 of the transaxle, to drive the wheels forward.

The Second Embodiment

The difference between this embodiment and the first embodiment lies in the arrangement of the two-speed gear set 31 and the connecting gear set 33.

Figure 3:
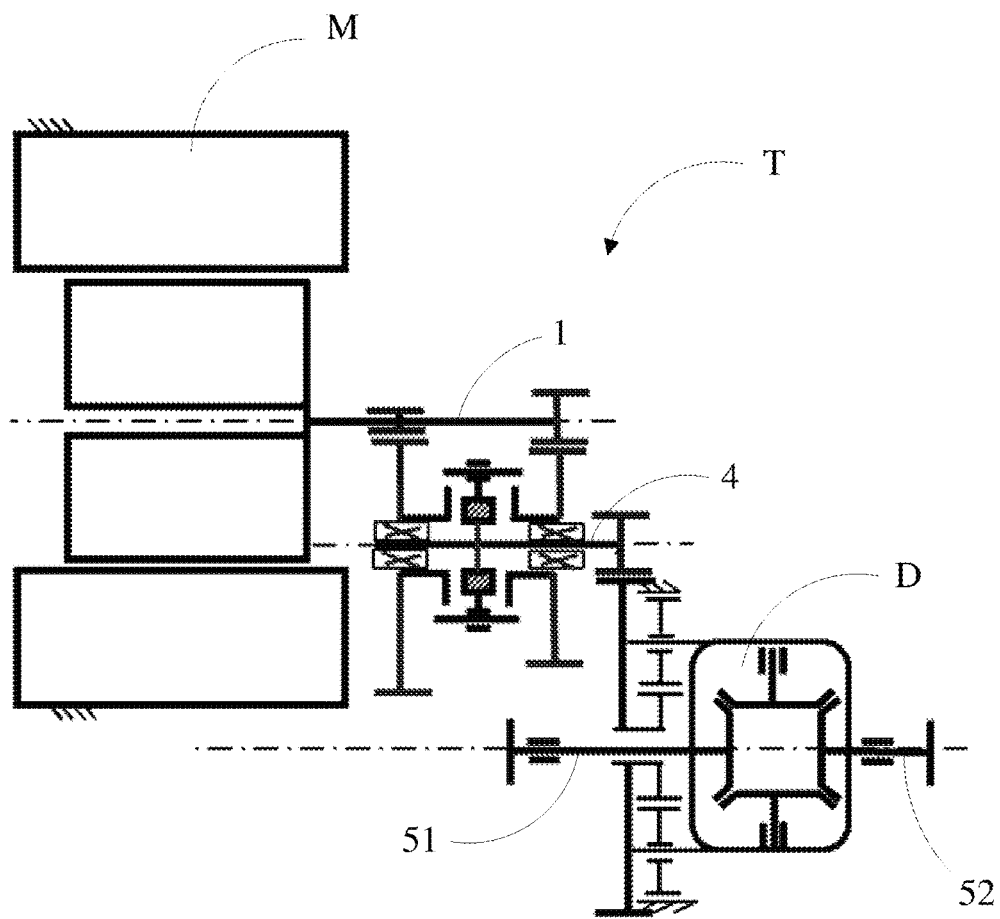
FIG. 3 is a structural schematic diagram of a transmission axle of the second embodiment of this invention.
Figure 4:
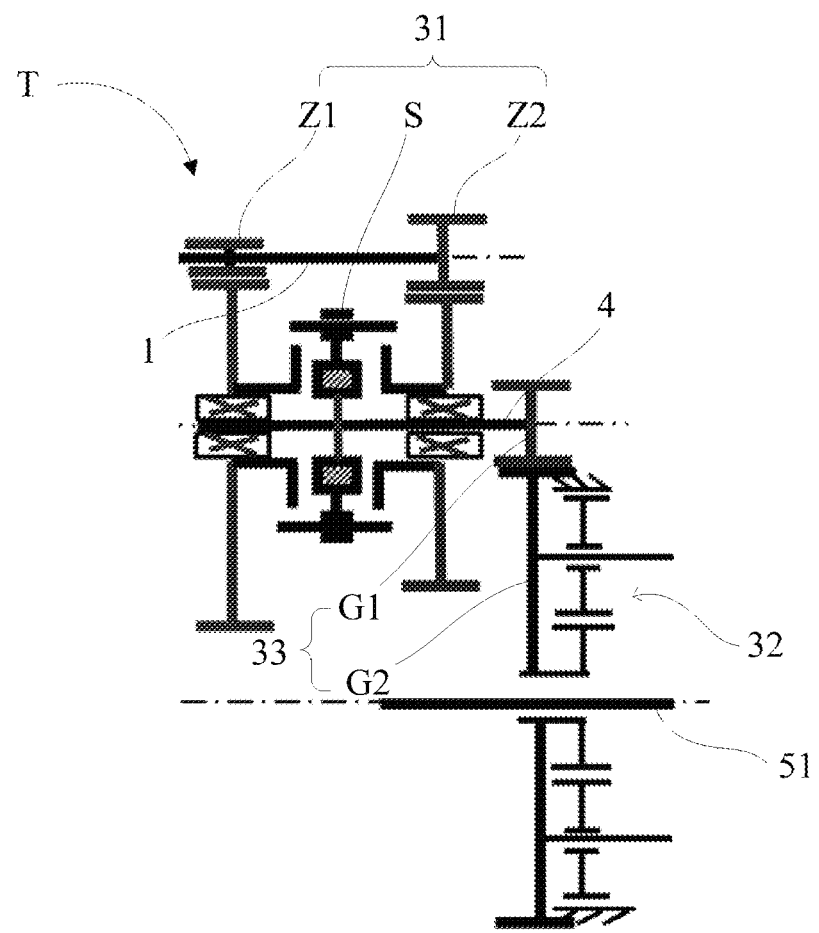
FIG. 4 is a schematic structural diagram of a two-speed drive module according to the second embodiment of this invention.

In this embodiment, as shown in FIGS. 3 and 4, the idler gears of the two sets of shift gear pairs Z1, Z2 are all on the intermediate shaft 4, as the driven gears of the shift gear pairs. The solid idler gears are all on the input shaft 1, as the driving gear of the shift gear pairs. The synchronizer S is also on the intermediate shaft 4 and is between the two idler gears in the axial direction.

The connecting gear set 33 is on one side of the two sets of shift gear pairs Z1, Z2 in the axial direction of the intermediate shaft 4. In which, the connecting gear set 33 includes a first gear G1 fixed to the intermediate shaft 4, and a second gear G2 connected to the input end of the planetary gear set 32. The first gear G1 and the second gear G2 mesh with each other.

Figure 5:
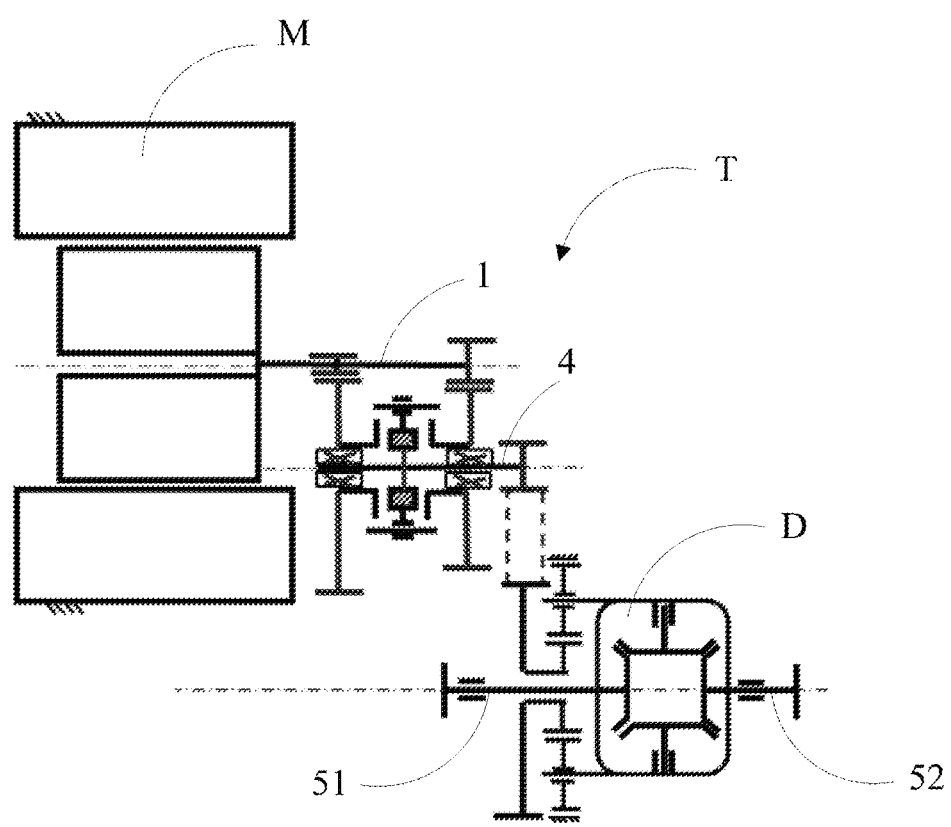
FIG. 5 is a structural schematic diagram of a transmission drive axle in a variation of the second embodiment of this invention.
Figure 6:
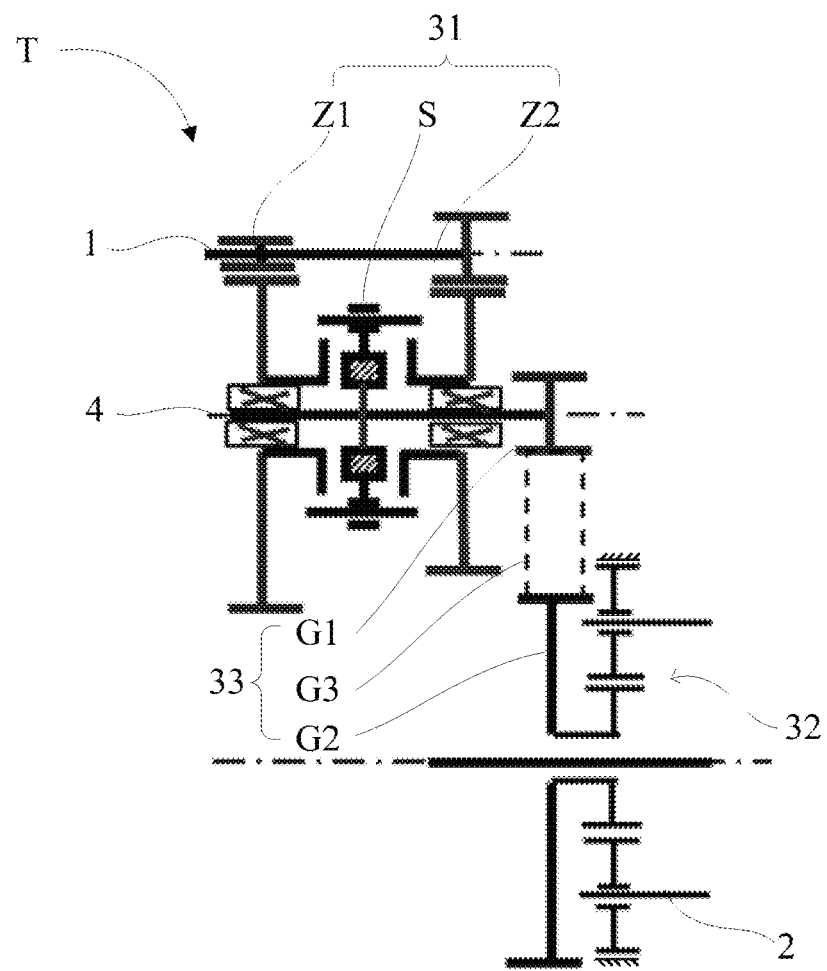
FIG. 6 is a schematic structural diagram of a two-speed drive module in a variation of the second embodiment of this invention.

In other embodiments, the first gear G1 and the second gear G2 can be connected via a transmission part G3, as shown in FIGS. 5 and 6. In which, the transmission part G3 may be a gear, a belt, a chain and so on.

Although this invention is disclosed as above, the invention is not limited thereto. Any person who is skillful in the art can make various alterations and modifications without departing from the spirit and scope of this invention. Therefore, the protection scope of this invention should be defined by the scope of the claims.

The invention claimed is:

1. A transaxle two-speed drive module comprising:
an input shaft;
an output shaft; and
a gear assembly for transmitting power between the input shaft and the output shaft, the gear assembly comprises:
  a two-speed gear set having two sets of shift gear pairs with different speed ratios, an intermediate shaft, and a synchronizer,
    the shift gear pairs including an intermeshing idler gear and a solid idler gear, the synchronizer being adapted for engaging with or disengaging from the intermeshing idler gear,
    the shift gear pairs being adapted to be drive-connected or disconnected from the input shaft in order to change an output rotational speed of the input shaft to different speed ratios;
  a planetary gear set having an output end that is drive-connected to the output shaft;
  a connecting gear set that drivingly connects the two-speed gear set and the planetary gear set; and
  the intermeshing idler gear and the synchronizer are on the input shaft, and the solid idler gear is on the intermediate shaft, and the connecting gear set is located between the two sets of the shift gear pairs, in an axial direction of the intermediate shaft.

2. The two-speed drive module of claim 1, wherein said connecting gear set includes a first gear that is fixed on said intermediate shaft, and a second gear that is connected to an input end of the planetary gear set; and
the first gear and the second gear are drive-connected via a transmission part.

3. The two-speed drive module of claim 2, wherein the transmission part is a gear.

4. The two-speed drive module of claim 2, wherein the transmission part is a belt.

5. The two-speed drive module of claim 2, wherein the transmission part is a chain.

6. The two-speed drive module of claim 1, wherein said planetary gear set includes a sun gear as an input end and includes a planetary carrier as the connection between the output end and the output shaft.

7. A transaxle comprising the two-speed drive module of claim 1, a motor, and a differential,
an output end of the motor is connected to said input shaft of the two-speed drive module, and an input end of the differential is connected to said output shaft of the two-speed drive module.

8. A transaxle two-speed drive module comprising:
an input shaft;
an output shaft; and
a gear assembly for transmitting power between the input shaft and the output shaft,
the gear assembly comprises:
  a two-speed gear set having two sets of shift gear pairs with different speed ratios, an intermediate shaft, and a synchronizer,
    the shift gear pairs including an intermeshing idler gear and a solid idler gear, the synchronizer being adapted for engaging with or disengaging from the intermeshing idler gear,
    the shift gear pairs being adapted to be drive-connected or disconnected from the input shaft in order to change an output rotational speed of the input shaft to different speed ratios;
  a planetary gear set having an output end that is drive-connected to the output shaft;
  a connecting gear set that drivingly connects the two-speed gear set and the planetary gear set;
  wherein said intermeshing idler gear and said synchronizer are on the intermediate shaft, and said solid idler gear is on said input shaft; and
  said connecting gear set is on one side of the two shift gear pairs, in an axial direction of the intermediate shaft.

9. The two-speed drive module of claim 8, wherein said connecting gear set comprises a first gear fixed on said intermediate shaft, and a second gear connected to an input end of the planetary gear set; and
said first gear and said second gear intermesh with each other.

10. The two-speed drive module of claim 8, wherein said connecting gear set includes a first gear that is fixed on said intermediate shaft, and a second gear that is connected to an input end of the planetary gear set; and
the first gear and the second gear are drive-connected via a transmission part.

11. The two-speed drive module of claim 10, wherein the transmission part is a gear.

12. The two-speed drive module of claim 10, wherein the transmission part is a belt.

13. The two-speed drive module of claim 10, wherein the transmission part is a chain.

* * * * *